Nov. 15, 1927.  
F. A. STEVENS  
1,649,789
OPHTHALMIC MOUNTING
Original Filed May 15, 1922
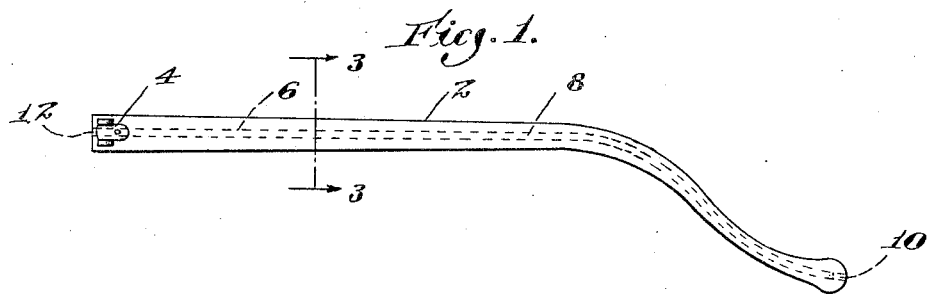
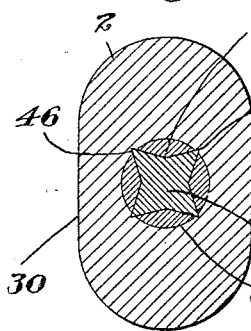 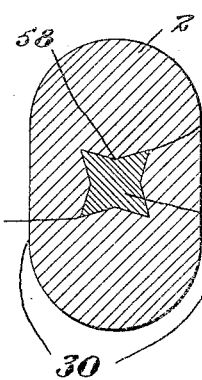 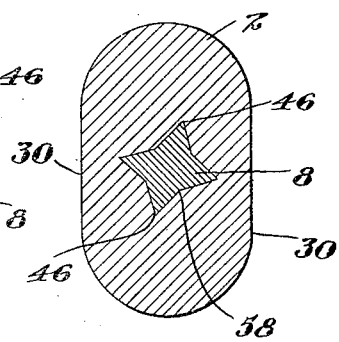
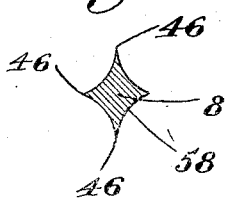 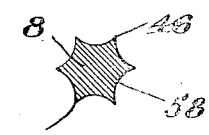 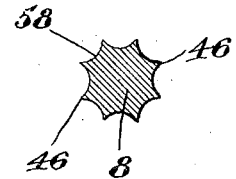
Inventor  
Frederick A. Stevens  
by David Rines  
Attorney Patented Nov. 15, 1927.

1,649,789

UNITED STATES PATENT OFFICE.

FREDERICK A. STEVENS, OF PROVIDENCE, RHODE ISLAND, ASSIGNOR TO BAUSCH & LOMB OPTICAL COMPANY, OF ROCHESTER, NEW YORK, A CORPORATION OF NEW YORK.

OPHTHALMIC MOUNTING.

Original application filed May 15, 1922, Serial No. 560,956. Divided and this application filed January 4, 1926. Serial No. 79,135.

The present invention relates to ophthalmic mountings, and though certain features thereof are applicable to other mountings, the invention relates more particularly to spectacle temples. The present application is a division of a copending application, Serial No. 560,956, filed May 15, 1922.

In the accompanying drawings, Fig. 1 is a side elevation of a spectacle temple constructed according to a preferred embodiment of the present invention; Fig. 2 is a section taken upon the line 3—3 of Fig. 1, illustrating a preferred method of manufacture; Fig. 3 is a similar section of the completed article; Fig. 4 is a similar section of a modification; and Figs. 5 to 7 inclusive are sections or modified reinforcing rods.

The invention is illustrated as applied to a spectacle temple of the combined-metal-and-non-metallic type, which is chosen to typify any ophthalmic mounting. The temple comprises a non-metal member 2 provided at its forward end with a hinge plate 4, whereby it may be hinged to a spectacle-lens frame. The member 2 tapers on its outer surface from the forward end towards the rear end, as shown in Fig. 1, and it is taperingly flattened at the sides 30. Spectacle temples of this type are commonly constituted of non-metal material wholly, and are therefore comparatively heavy and clumsy, and rather thick at the rear end, to provide the necessary rigidity for holding the temple in place behind the ear. This is particularly true of skull temples, for the rear ends of skull temples are designed to engage, and hold firmly against, the skull, and this they can not do unless the non-metal material is thick and of substantial proportions.

According to the invention claimed in a copending application, Serial No. 497,640, filed September 1, 1921, it is possible to make the thickness of the rear end of the temple small compared to that of the forward end, the required rigidity being attained by the use of a reinforcing member. To this end, the non-metal member 2 is constituted of a seamless tube within the bore 6 of which is completely enclosed a reinforcing member 8, such as a metal rod. A temple so constructed, though very thin at the rear end, will maintain any form into which it may be shaped, and will be strong enough to press firmly in and to hold against, the skull. The ends of the bore are plugged with non-metal plugs 10 and 12, effectually concealing the reinforcing member. The plugs are integrally secured to the walls of the bore 6, as by the use of a solvent, or in any other desired manner. It is found, in practice, however, that in a temple so constructed, there is a tendency for the metal rod to twist in the bore 6 when the parts of the temple are bent to shape. This twisting, of course, destroys the rigidity of the structure as a whole, and the degree of twist increases with use.

The chief object of the present invention is to provide an improved temple in which this twisting effect is eliminated. To this end, a feature of the invention resides in the use of a reinforcing rod 8 that is provided with sharp or nearly sharp, ridges 46 that bite into, and so become embedded within, the non-metal material, the ridges being connected together by reentrant curves or angles 58. It is obviously impossible for a rod 8 so embedded to twist in its bore 6.

The preferred reinforcing rod 8 is approximately square in cross section, as shown in Figs. 2 and 3, but this is not essential, as other cross-sectional shapes may equally well be employed. In the interest of increased rigidity, the rod should not yield or bend transversely more readily in one direction than another, so that if the rod is not strictly square in cross section, it should have some of the properties of the square-sided configuration. Reinforcing rods that are diamond-shaped in cross section, as shown in Fig. 5, or hexagonal, Fig. 6, or octagonal, Fig. 7, are all adapted to the purpose in hand. A regular octagon would not be so useful, because approximating too much to the shape of a circle; but if provided with the before-mentioned reentrant angles or curves, the ridges 46 are rendered more pronounced. It is not essential that the reinforcing rods occupy any particular position in the non-metal member, as will be understood from Figs. 3 and 4, both of which represent efficient constructions.

To insert the rod in the bore 6, which is usually originally circular in cross section, as shown in Fig. 2, the wall of the bore 6 is first preferably softened, as by the use of alcohol, acetone or other solvent, after which the reinforcing rod is forced into the bore. The ridges 46 dig into the non-metal material as the rod is forced into the bore, becoming firmly locked in place, and the softened, non-metal material collects between the faces of the rod and the wall of the bore 6, acting as a lubricant while the rod is being forced into place, but becoming ultimately hardened and solid, as will be understood from Fig. 3. It will therefore be understood that the diameter of the bore 6 should be greater than the side of the cross-sectional square shown in Fig. 2, but less than the diagonal of the square, and similar considerations will hold with other shapes than squares. After the parts have become set, the temple is bent into the required shape, illustrated in Fig. 1. It will be found that the metal and the non-metal material will bend as a unit, without twisting.

The invention is obviously not restricted to the exact embodiments that are illustrated herein, and other modifications within the spirit of the invention will occur to persons skilled in the art, and are intended to be embraced within the scope of the appended claims.

What is claimed as new is:

1. An ophthalmic mounting comprising a non-metal tube, and a reinforcing member in the bore of the tube embedded in the non-metal material, the member having substantially sharp ridges connected together reentrantly.

2. An ophthalmic mounting comprising a non-metal tube tapering from the forward end towards the rear end and the opposite sides of which are flattened, the thickness of the rear end being small compared to that of the forward end, and a reinforcing member in the bore of the tube, the reinforcing member being square in cross section, with the ridges of the square embedded in the non-metal material and connected together reentrantly, the mounting being bent into the shape of a spectacle temple.

3. A spectacle temple comprising a non-metal member, and a substantially sharp ridged reinforcing metal member in the non-metal member, the ridges being embedded in the non-metal material and connected together reentrantly.

4. A spectacle temple comprising a non-metal tube, and a reinforcing metal member in the bore of the non-metal tube, the reinforcing member being provided with substantially sharp ridges embedded in the non-metal material, the ridges extending substantially throughout the length of the reinforcing member and being connected together reentrantly.

5. An ophthalmic mounting comprising a non-metal tube, and a reinforcing member in the bore of the tube, the reinforcing member being provided with substantially sharp ridges embedded in the non-metal material, the ridges being coextensive with the non-metal material in which the reinforcing member is embedded and being connected together reentrantly.

6. An ophthalmic mounting comprising a non-metal tube, and a reinforcing member in the bore of the tube and having a plurality of ridges extending substantially throughout its length and embedded in the non-metal material substantially throughout their length, the ridges being connected together reentrantly.

7. An ophthalmic mounting comprising a non-metal member tapering from the forward end towards the rear end and the opposite sides of which are flattened, the thickness of the rear end being small compared to that of the forward end, and a reinforcing member in the non-metal member having ridges embedded in the non-metal material and connected together reentrantly, the mounting being bent into the shape of a spectacle temple.

8. A spectacle temple comprising a non-metal member, and a reinforcing metal member in the non-metal member, the reinforcing member being square in cross section, with the ridges of the square embedded in the non-metal material and connected together reentrantly.

9. A spectacle temple comprising a non-metal seamless tube, and a reinforcing metal member in the bore of the non-metal tube, the reinforcing member being provided with pronounced, substantially sharp ridges embedded in the non-metal material throughout their length, the ridges extending substantially throughout the length of the reinforcing member and being connected together reentrantly.

10. A spectacle temple comprising a non-metal tube, and a reinforcing member in the bore of the tube, the reinforcing member being provided with a plurality of substantially parallel ridges substantially separated from each other and extending continuously substantially throughout its length and embedded substantially throughout their length in the non-metal material, the ridges being coextensive with the non-metal material in which they are embedded and being connected together reentrantly.

In testimony whereof, I have hereunto subscribed my name.

FREDERICK A. STEVENS.